April 30, 1929.  A. W. F. MANZEL  1,711,173
SHOCK ABSORBER
Filed May 24, 1923
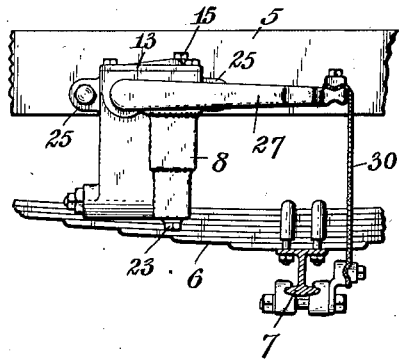
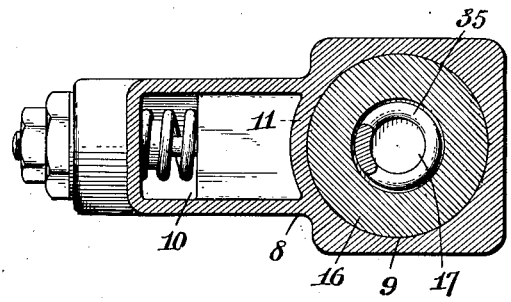
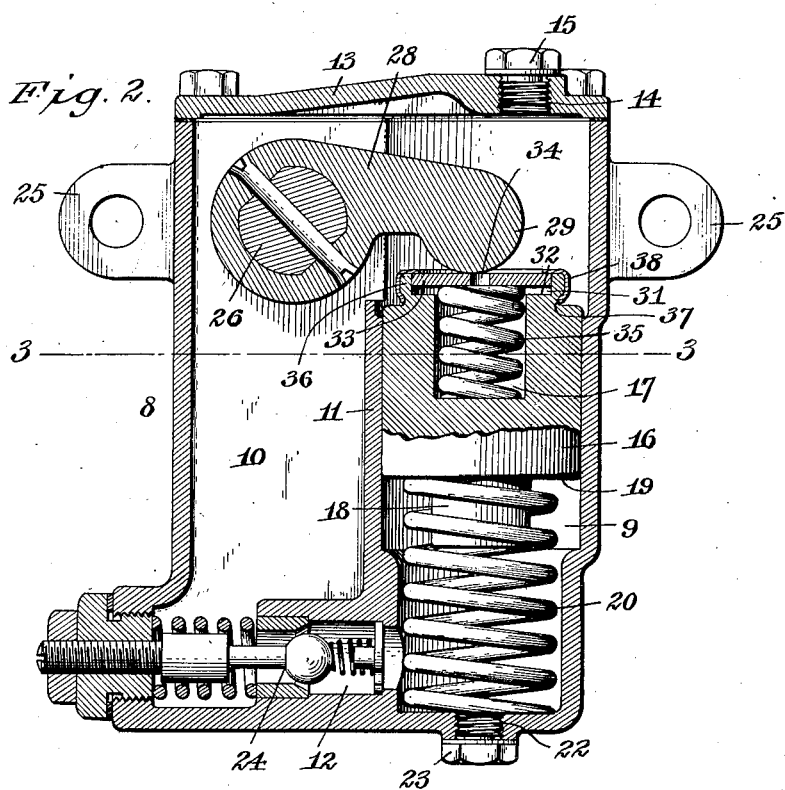
Inventor:
Adolph W. F. Manzel,
By Emil Neuhart
Attorney.
Witness:
J. J. Oberst, Patented Apr. 30, 1929.

1,711,173

UNITED STATES PATENT OFFICE.

ADOLPH W. F. MANZEL, OF BUFFALO, NEW YORK, ASSIGNOR TO MANZEL BROS. CO., OF BUFFALO, NEW YORK, A CORPORATION OF NEW YORK.

SHOCK ABSORBER.

Application filed May 24, 1923. Serial No. 641,151.

My invention relates to shock absorbers for automobiles or other vehicles, and more especially to that type in which oil or some other suitable fluid is caused to pass from one chamber to another through a restricted passage and which are generally referred to as "hydraulic" shock absorbers; certain features of the invention, however, being designed for use in any other type of shock absorber acting to suddenly check a rebound when passing into a rut or over a projection in the road.

This invention is a continuation in part of my application for patent Serial No. 560,292, filed May 12, 1922, and issued as Patent No. 1,510,185, September 30, 1924.

Shock absorbers, and especially those containing oil as the checking medium, offer sudden resistance to slight jars, such as an automobile is subjected to in passing over roads constructed of cobble stones, or other roads causing sharply emphasized but short and pithy shocks, which are objectionable and nerve racking, especially when traveling over roads of this kind for any length of time; such shocks, unless absorbed, being transferred to the spine of a person seated within a vehicle.

While shock absorbers of the type stated are highly desirable and efficient for absorbing shocks caused by comparatively pronounced depressions or elevations in a road, due to the fact that the force of the shocks is sufficient to quickly overcome the initial resistance offered thereagainst, slight shocks do not create sufficient force for this purpose. and therefore the sudden resistance offered against the shocks in reality make absorbers of this type undesirable at times, especially for city use or for country driving where the roads are constructed of brick or other material which form or have comparatively small depressions or elevations.

It is the primary object of my invention to provide a shock absorber with a main fluid-resisting shock-absorbing device and a secondary shock-absorbing device, both enclosed within the same casing and preferably co-axial, said secondary shock-absorbing device being adapted to be brought into action and resiliently and easily absorb slight rebounds and being so constructed that its shock absorbing qualities are spent under a rebounding force which, if increased, will act upon the main shock absorbing device or, in other words, upon the fluid-resisting portion of the device, shown in the drawing hereof.

Another object of my invention is to provide a shock absorber of the type stated, in which two related absorbing means or devices are contained within a casing or housing, and in which one is brought into action after the other, under a force overcoming the resistance of one and immediately applied to the other so that the shocks are absorbed by a resistance offered by the two without any perceptible break and so that a smooth resisting force is provided under all riding conditions.

The invention therefore consists in a shock absorbing device having two absorbing means or devices confined within a single casing, one of which is a fluid-resisting means or device and is brought into action after the other when the absorbing qualities of one are consumed during a portion of a shock.

It further consists in providing a hydraulic shock absorber with initial or what may be termed secondary or auxiliary shock-absorbing means, which alone is brought into action when the automobile or other vehicle is subjected to what I term slight "staccato" shocks.

It further consists in the novel features of construction and in the combination and arrangement of devices and parts to be hereinafter described and more particularly pointed out in the subjoined claims.

In the drawings:—

Fig. 1 is a sectional elevation of a portion of an automobile or other vehicle, having my improved shock absorber applied thereto, the parts of the automobile or vehicle shown being those adjacent the shock absorber.

Fig. 2 is a central vertical section through the shock absorber.

Fig. 3 is a horizontal section taken on line 3—3, Fig. 2.

In Fig. 1 of the drawing I have shown the parts of an automobile to which one of my improved shock absorbers is applied, and in the manner illustrated, these parts are at the front of the automobile; it being of course understood that a shock absorber is provided at each side of the automobile or other vehicle, and that a pair of shock absorbers may be used at the front or the rear, or both at the front and the rear.

The reference numeral 5 designates the frame or chassis of an automobile, hereinafter referred to as a vehicle, and 6 one of the leaf springs fastened to said frame or chassis and to an axle 7 in any suitable manner.

When passing a rut in the road, the leaf spring becomes flexed, opposite ends of the spring being forced closer to the road surface under spring flexure, with the result that the body of the vehicle connected to said ends is drawn downwardly, the tendency of the spring to recover after passing over the rough portion or portions of the road will throw up the body of the vehicle, thereby unduly straining the springs. Even when the shocks or flexure of the springs are slight, riding within the vehicle is uncomfortable, and when deep ruts or pronounced elevations are encountered, the occupants are forcibly raised from their seats and dropped back under complete loss of control.

The body and spring, or the axle supporting the spring, may be considered as two relatively movable parts of a vehicle, to one of which the housing or casing of my shock absorber is secured and to the other of which an element extending from said housing or casing and actuating parts therein is connected.

The housing or casing is designated by the numeral 8 and is divided into two chambers 9, 10, by a wall 11. The chamber 9 is cylindrical and serves as a cylinder while the chamber 10 may be of any desired formation in cross section. The lower ends of the cylinder 9 and chamber 10 are connected by a fluid passage 12. The wall 11 extends upwardly from the wall of said passage and terminates in a plane a distance beneath the upper end of the casing. Above the upper end of the wall 11, chamber 10 is in direct communication with the cylinder 9, the cylindrical formation of the latter being continued upwardly to the top of the casing. The upper end of the casing is closed by a suitable cover 13 bolted or otherwise fastened to the casing, with packing provided between the upper end of the casing and the cover to prevent leakage of oil therebetween. The cover 13 is provided with a filling opening 14 closed by a suitable closure 15, oil being furnished to the casing through said filling opening.

Within the cylinder 9, a piston 16 is slidably fitted, said piston, in its preferred form, being solid and having an axial upwardly-opening bore 17. This piston is provided with a reduced lower end 18 to form a downwardly facing shoulder 19 on said piston. Bearing with one end against said shoulder and surrounding said reduced portion 18 is an expansion spring 20, the other or lower end of which bears against the bottom of the casing, and more particularly, against the bottom of the cylinder 9.

The piston is fitted into the cylinder 9 and is adapted for movement therein. The bottom of the cylinder is provided with a drain opening 22 closed by means of a plug or other closure 23 so that oil within the casing can be conveniently drained whenever found necessary or desirable.

Within the fluid passage 12, fluid-regulating means 24 is located, said means being more particularly set forth in my co-pending application, Serial No. 560,292, filed May 12, 1922. This fluid-regulating means serves to allow a comparatively free passage of fluid from the chamber 10 into the cylinder 9 when the piston within said cylinder moves upwardly while it serves to restrict the flow of the fluid from the cylinder 9 to the chamber 10 which the piston moves downwardly, and while I have illustrated a particular regulating means or device within the passage for this purpose, it is to be understood that any means, whether within a passage arranged as shown, or otherwise, accomplishing substantially the functions of the means shown, may be substituted, as the particular features of my invention herein referred to as an initial, or secondary, or auxiliary shock absorbing means may be used in connection with any kind of regulation means serving to regulate the flow of fluid from one chamber to another as required in a shock absorber of this type.

Oil is delivered into the casing through the filling opening 14 in the cover and is preferably maintained at a level above the upper end of the piston when in normal position. However, the construction is of such a nature that the operation of the device will be thoroughly effective if the level is below that stated.

Projecting from the casing are securing lugs 25 by means of which it may be fastened to the frame or chassis of the vehicle, suitable bolts or other fastening means being provided for the purpose. Extending transversely through the casing is a rock shaft 26, which is preferably integral with a crank or actuating lever 27 extending from one end of said shaft. That portion of the rock shaft positioned between the two side walls of the casing has an actuating arm 28 secured thereto, the outer end of which is provided with a rounded contact portion 29, for a purpose to appear hereinafter. A strip of webbing or other flexible material 30 is secured with one end to the free end of said actuating lever 27 and it has its other end fastened to the axle 7 of the vehicle.

The upper end of the axial upwardly opening bore 17 of the piston is enlarged, as at 31, to form an upwardly-facing shoulder 32, and said enlarged upper end 31 may be said to serve as an auxiliary cylinder.

33 is what may be termed an auxiliary piston, which is in the form of a disk having an axial air and oil opening 34 therein. This auxiliary piston is reciprocally held in said axial bore by means to be hereinafter described. Within the bore 17 is an expansion spring 35, which extends upwardly into the auxiliary cylinder 31 and which may be referred to as an auxiliary expansion spring. The upper end of said auxiliary expansion spring bears against the under side of the disk or auxiliary piston 33, and the lower end thereof bears against the lower wall of the bore 17 within the piston 16, which latter may be referred to as the main piston, while the cylinder 9 receiving said main piston, may be termed the main cylinder.

The upper end of the main piston 16 is reduced in diameter to form an upstanding annular flange or neck 36, which surrounds the auxiliary cylinder or enlarged upper end of the axial bore 17, and at the juncture of said flange or neck to the body portion of said main piston is an annular groove 37. A stop ring 38 is fitted around the annular flange or neck 36, the lower marginal portion thereof being spun, rolled, or otherwise forced into the annular groove 37 to prevent upward movement of said ring under pressure, and the upper marginal portion of said ring being forced inward over the upper edge of the flange or neck so as to overhang the inner peripheral surface of said flange or neck, and thus form an annular stop against which the disk or auxiliary piston 33 is normally held by the action of the auxiliary expansion spring 35. The rounded contact portion 29 of the actuating arm is normally in contact with the upper face of the auxiliary piston 33 and the force exerted by the spring 20—for convenience termed the main spring—and the axial spring 35 causes the webbing or other flexible connection 30 to be held taut at all times. By reason of said springs forcing the auxiliary piston against the actuating arm, the force of said springs being sufficient to move said arm upwardly, and by reason of the rock shaft 26 being rotated during the upward movement of said arm, the outer end of the actuating lever to which the webbing or flexible material 30 is secured is forced upwardly.

In Fig. 2, the parts are shown in normal position, and in this position a comparatively small annular space is provided in the fluid passage 12, which space will become enlarged under certain operating conditions, to be presently described. When the casing is provided with the necessary quantity of oil or other fluid, the fluid will fill the cylinder 9 and the chamber 10, also the fluid passage 12. Under normal conditions I prefer that the level of the fluid be at least even with the edge of the wall 11 between the cylinder 9 and chamber 10.

When the vehicle to which the device is applied, travels over uneven roads, passes over ruts, or strikes an obstruction, the body of the vehicle will lower, due to its being supported by the springs 6, which become flexed; the result being that the casing moves downwardly with the body of the vehicle and positions the actuating lever 27 at an angle to the horizontal. This causes the actuating arm 28 to assume a similar position, in which position the free end thereof more closely approaches the cover 18 of the casing, with the result that both pistons 16 and 33 are forced upwardly. This upward movement of the pistons creates suction within the lower portion of the cylinder 9, also within the passage 12 connecting the chamber 10 with said cylinder, the result being that the restricted opening in the fluid passage 12 is enlarged, thereby permitting the fluid in the chamber 10 to be drawn in freely through said fluid passage and into the cylinder 9, causing the fluid in the chamber 10 to be lowered, and filling the enlarged unoccupied portion of the cylinder 9 by reason of the elevation of the piston 16 therein. It is of course apparent that the main spring 20 lifts the main piston 16 during such action and carries with it the auxiliary spring 35 and the auxiliary piston 33 within said main piston, substantially the same co-relation being maintained between the two pistons after such operation as existed before the same, or while in normal position.

When the chassis and body of the vehicle move upwardly on what is generally termed the rebound, the casing moves upwardly with the body, or with respect to the webbing or flexible connection 30, with the result that the actuating lever 27 will gradually assume a horizontal position or a less inclined or angular position, and at times even an oppositely-inclined or angular position, depending in the first instance on the normal position of said lever. However, as shown in the drawings, the lever is substantially in horizontal position when the parts are normal, and consequently after assuming a rearwardly-inclined position when the body lowers and the vehicle spring is flexed, the recovery of the body will return said lever to horizontal position, with the result that the free end of the actuating arm 28 will again assume the position shown in Fig. 2, causing the auxiliary piston 33 to be depressed within the main piston against the force of the auxiliary spring 35 and then causing the main piston 16 to be depressed within its cylinder. During the downward movement of the main piston within its cylinder, oil within said cylinder is forced outwardy from the lower portion thereof into the chamber 10 and by reason of the employment of the means in the fluid passage 12 illustrated in my aforesaid copending application, the pressure will cause the passage to be restricted; consequently, assuring a slow depression of the piston within the cylinder and thus preventing a quick rebound.

It is clear therefore that when the main piston rises, the suction created within the cylinder beneath said piston will cause an enlargement of the passage connecting the chamber 10 with the cylinder 9, allowing the fluid to be drawn in quickly to fill the lower portion of the cylinder; whereas, when the piston lowers, said passage becomes restricted and a slow escape of the fluid from the cylinder occurs. This results in a slow upward recovering movement of the body of the piston and a naturally slow recovery of the springs 20 and 35 to normal positions, thereby preventing upthrow of the vehicle body and assuring comfortable riding for the occupants.

The essential feature of my invention, however, resides in providing initial shock-absorbing means in conjunction with fluid-resistitng or hydraulic shock-absorbing means and adapted to absorb slight jars, such as created in passing over cobblestone pavement or like surfaces, and therefore where the shocks are slight and occur in quick succession, the force will not be sufficient to depress the main piston but will be imparted to and absorbed by the auxiliary spring 35 underneath the auxiliary piston 33, which latter piston moves independent of and within the main piston against the power of said auxiliary spring; said spring becoming compressed and recovering itself under successive jars and shocks so that easy riding is assured under such conditions, in contradistinction to the ordinary shock absorbers in which the resistance to be overcome by the slight jars or shocks is so great that downward movement of the piston cannot take place until a considerable downward flexure of the vehicle body occurs; therefore, when traveling over cobblestone pavements or roads having similar surfaces, a resistance is offered which is of sufficient force to prevent proper flexure of the springs supporting the vehicle body, the result being that occupants of the vehicle are caused to be subjected to slight jolts, similar to those received when riding on a heavy vehicle not equipped with springs, which jolts are imparted to the spine of the occupant, to his discomfort.

By the use of my secondary or auxiliary shock-absorbing device, these slight shocks or jars are fully absorbed without placing the main shock-absorbing device into action.

Another advantage is that when the force of the shocks or jars are sufficient to fully depress the auxiliary piston, such force will be sufficient to start the main piston on its downward movement without a break in the downward movement of the free end of the actuating arm 28 so that the gradually increasing force applied to the shock absorber will be absorbed between the auxiliary shock-absorbing device consisting of the auxiliary piston 33 and auxiliary spring 35 and the main shock absorbing device, which includes the cylinder 9, chamber 10, fluid passage 12 with its regulating mechanisms, main piston 16, and main spring 20.

I am aware that spring-resisting shock-absorbing means in which springs of different resisting powers are employed are not new, but I believe that a hydraulic shock absorber having a main fluid-resisting absorbing device and an auxiliary spring-resisting absorbing device for initial shocks, embodied in a unitary structure, or otherwise expressed, within a single casing, has not heretofore been used; and therefore

Having thus described my invention, what I claim is:—

1. A hydraulic shock absorber comprising a fluid-resisting shock-absorbing device and a spring-resisting shock-absorbing device co-axial with said fluid-resisting shock-absorbing device, a single casing enclosing both shock-absorbing devices, said spring-resisting shock-absorbing devices being brought into action before said fluid-resisting shock-absorbing device and both shock-absorbing devices serving to present a resisting force from minimum to maximum without perceptible check in yielding action, and an actuating lever exerting force against said spring-resisting shock-absorbing device and through the latter against said fluid-resisting shock-absorbing device.

2. A shock absorber comprising a casing having two fluid-containing chambers connected by a passage, controlling means in said passage for controlling the flow of fluid from each chamber to the other, means within one of said fluid-containing chambers for causing the fluid to flow from each chamber to the other through said passage including an initial shock absorbing device whose resistance force is fully overcome before fluid will be caused to flow from one chamber to the other.

3. A shock absorber comprising a casing having two fluid-containing chambers connected by a passage, controlling means within said passage for controlling the flow of fluid from each chamber to the other, means for causing the fluid to flow from each chamber to the other through said passage, and an initial shock absorbing device within said casing adapted to absorb slight shocks and jars without placing said last-mentioned means into action.

4. A shock absorber comprising a casing having two fluid-containing chambers connected by a passage, fluid controlling means within said passage, a piston in one of said chambers having an axial bore, a spring acting against said piston to retain the same in elevated position, a piston within said axial bore, a spring between the bottom of said bore and said second-mentioned piston, and an actuating arm bearing against the upper end of said second-mentioned piston.

5. A shock absorber comprising a casing having two chambers and fluid regulating means between said chambers, an actuating element within said casing adapted to be connected with a part of a vehicle, a piston within one of said chambers adapted to draw fluid from the other chamber and to force fluid into said other chamber, and a spring resisting device carried by said piston and with which said actuating element co-acts.

6. A shock absorber comprising a casing having two chambers and regulating means between said chambers, a main shock absorbing device within one of said chambers, and an auxiliary shock absorbing device within said last-mentioned chamber adapted to absorb slight shocks and jars before said main shock absorbing device is brought into resisting action.

7. A shock absorber comprising a casing having two chambers and fluid regulating means between said chambers, an actuating element, a piston within one of said chambers adapted to draw fluid from the other chamber and also to force fluid thereinto, and a spring shock absorbing device carried by said piston with which said actuating element co-acts, said piston being actuated through the medium of said spring shock absorbing device when the resisting force of the latter is overcome.

8. A hydraulic shock absorber comprising a casing, a fluid-resisting shock-absorbing device within said casing, an actuating lever without said casing, an initial spring-resisting shock-absorbing device also within said casing interposed between said actuating lever and said fluid-resisting shock-absorbing device and adapted to be brought into action before said fluid-resisting shock-absorbing device.

9. A shock absorber comprising a casing, spring-resisting means within said casing to absorb slight shocks, and fluid-resisting means also within said casing to absorb said heavier shocks, said fluid-resisting means being brought into action through the medium of said spring-resisting means when the absorbing force of the latter is expended.

10. A shock absorber comprising a casing having two chambers, fluid-regulating means between said chambers, a piston within one of said chambers having an axial bore enlarged at its upper end to form an upwardly-facing shoulder, a piston within the enlarged upper end of said axial bore, means to retain said piston within the enlarged upper end of said bore, and a spring within said bore exerting force upwardly against said last-mentioned piston.

11. A shock absorber comprising a casing having two chambers, fluid-regulating means between said chambers, a piston within one of said chambers having its upper end reduced in diameter and having an axial bore opening at the top of said piston and enlarged at its upper end, a disk within said enlarged upper end, a stop device applied to the reduced upper end of said piston against which said disk normally bears, and a spring within said axial bore bearing against the under side of said disk.

12. A shock absorber comprising a casing having two chambers, fluid-regulating means between said chambers, a piston within one of said chambers having a reduced upper end forming a neck and having an annular groove in said neck, said piston having an axial bore, a stop ring applied to said neck and fitted into the annular groove thereof, said stop ring overhanging the wall of said axial bore, a piston within said axial bore bearing against the overhanging portion of said stop ring, and a spring in said axial bore bearing against the under side of said last-mentioned piston.

13. In a shock absorber, a casing having two chambers, fluid-regulating means between said chambers and two spring-retained pistons within one of said chambers, one of said pistons being brought into action before the other to absorb slight shocks and said other being brought into action to absorb heavier shocks.

14. A shock absorber comprising a casing having two chambers separated by a wall, fluid-regulating means between said chambers, a spring-pressed piston within one of said chambers having an axial bore enlarged at its outer end, a stop device overhanging the wall of the enlarged upper end of said axial bore, a disk within the enlarged upper end of said axial bore having an opening therein, a spring in said axial bore to normally force said disk against said stop device, and an actuating element within said casing adapted to be connected with a part of a vehicle and adapted to bear against said disk.

In testimony whereof I affix my signature.

ADOLPH W. F. MANZEL.